US012762914B1

(12) United States Patent
Heusala et al.

(10) Patent No.: US 12,762,914 B1
(45) Date of Patent: Oct. 13, 2026

(54) METHOD AND MEANS FOR WALLET SUPPORT FOR LOCKS WITHOUT BATTERIES

(71) Applicant: iLOQ Oy, Oulu (FI)

(72) Inventors: Janne Heusala, Oulu (FI); Harri Ahola, Oulu (FI); Tomi Karjalainen, Oulu (FI)

(73) Assignee: iLOQ Oy, Oulu (FI)

( * ) Notice: Subject to any disclaimer, the term of this patent is extended or adjusted under 35 U.S.C. 154(b) by 0 days.

(21) Appl. No.: 19/541,984

(22) Filed: Feb. 17, 2026

Related U.S. Application Data

(60) Provisional application No. 63/944,049, filed on Dec. 18, 2025.

(51) Int. Cl.
*H04W 12/06* (2021.01)
*G07C 9/28* (2020.01)

(52) U.S. Cl.
CPC .............. *G07C 9/28* (2020.01); *H04W 12/06* (2013.01)

(58) Field of Classification Search
CPC ... H04L 51/02; H04L 51/216; H04L 65/1069; H04L 69/14
See application file for complete search history.

(56) References Cited

U.S. PATENT DOCUMENTS 8,774,714 B2 7/2014 Metivier
2014/0120905 A1* 5/2014 Kim ........................ H04W 4/80 455/426.1
2015/0102904 A1* 4/2015 Oh ...................... E05B 47/0012 340/5.61
2016/0133071 A1* 5/2016 Henderson ........... G07C 9/0069 70/277
2021/0134096 A1* 5/2021 Pukari ................... H04W 12/06
2025/0118120 A1* 4/2025 Augustyn .......... G07C 9/00309

FOREIGN PATENT DOCUMENTS

EP 2425516 B1 12/2015

OTHER PUBLICATIONS

Demcko, Ron et al. "A look at Modern Capacitors used in power-conversion," European Passive Components Institute, Nov. 2023, retreived Feb. 13, 2026 from https://epci.eu/wp-content/uploads/2023/11/5_2_KAVX_Modern-Capacitors-in-power-conversion_Paper-2023-2.pdf.

* cited by examiner

*Primary Examiner* — Gil H. Lee
(74) *Attorney, Agent, or Firm* — Patterson + Sheridan, LLP

(57) ABSTRACT

The invention relates to power systems and locks (100, 300, 500, 700, 900, 1000). More particularly, the invention relates to mobile phone (101, 301, 501, 701, 901, 1001)-based powering of locks. Wallet (103, 312, 512, 712, 912) based access credentials are fast becoming an industry standard access method in digital access management. This publication discusses strategies to combine virtual key credentials from applications with self-powering in digital locks. The invention allows the use of self-powered locks by all or some consumers, without a dedicated application from the lock manufacturer. The invention is simpler, as the consumer can open the lock from his mobile wallet application, or with a separate mobile Keys application (716, 1012). The invention also reduces the end cost to the consumer, because self-powered locks typically present life-time financial savings to consumers.

25 Claims, 10 Drawing Sheets

20

METHOD AND MEANS FOR WALLET SUPPORT FOR LOCKS WITHOUT BATTERIES

CROSS-REFERENCE TO RELATED APPLICATIONS

This application claims benefit of U.S. Provisional Patent Application No. 63/944,049 filed Dec. 18, 2025. The aforementioned related application is herein incorporated by reference in its entirety.

TECHNICAL FIELD OF INVENTION

The invention relates to power systems and locks. More particularly, the invention relates to mobile phone-based powering of locks.

BACKGROUND

Consumers have a universal desire for cheaper and more simpler products.

The physical key with which a lock can be opened has stood the test of time.

This might not be the case any longer.

EP2425516B2 discloses a lock that can be opened with a mobile phone, even when the battery of the lock fails with the mobile phone delivering power to the lock via NFC. This document is cited here as reference.

"A look at Modern Capacitors used in power-conversion" by Ron Demcko and Slavo Pala reviews energy storage strategies of the prior art. This document is cited here as prior art reference.

The inventors are familiar with a proprietary smartphone app they have developed, capable of opening a self-powered lock.

The invention will improve on the technologies of the prior art and present a simple and economic new lock and virtual key of the future.

SUMMARY

The invention concerns a technology to enable mobile digital wallet-based access credentials to be used with battery-less locks, i.e. those locks without a battery.

Digital Wallet, (typically Apple, Google) based access credentials are fast becoming an industry standard access method in digital access management. This can be problematic with some locking products, because wallet technologies are always working in passive NFC tag mode and so do some locks which are without batteries. NFC communication requires Reader/Writer and Tag roles. If both the digital wallet and the lock would be in the tag mode, wallet support is not feasible. This is because the lock is expecting power from the mobile phone of digital wallet and vice versa. And both end up merely expecting power, but not getting power from one another.

This problem is new and does not involve most other access control manufacturers, which have power sources in their locks. These locks with power sources work by default with a digital wallet.

There are not many lock manufacturers utilizing NFC power from mobile phones in their locks. This invention aims to integrate mobile phone-based power harvesting technologies with digital wallets.

Existing locks from other manufacturers utilizing wallet access control credentials are battery powered which causes many problems in terms of maintenance, durability and security. This invention enables using digital wallet access credentials in battery-less locks. This enhances the usability of the lock opening greatly, while still retaining the benefits of the battery-less locking solution.

In theory, there are several ways to implement energy harvesting for digital locks such as solar power and kinetic energy. However, all of these involve several challenges in costs, durability and feasibility.

Energy harvesting solution utilizing the NFC technology is the most efficient for this purpose as the lock powering happens during the lock opening. This eliminates several attack scenarios on the lock. Additionally, energy harvesting using NFC is not dependent on environmental effects like solar power is, and/or kinetic energy-based solutions are, or may be.

Enabling digital wallet support for self-powered lock, or for an energy harvesting lock, would be a technological game changer.

According to one aspect of the invention, a self-powered lock is opened using a virtual key in the wallet application, which comes with the operating system, of the mobile smartphone. During the opening, power is delivered from the mobile phone to the self-powered digital lock via NFC, NFC WLC or Qi.

According to another aspect of the invention, the inventive mobile smartphone operating system will have a "keys" application, or the like, which will host virtual keys configured to open a self-powered lock, or potentially in fact any lock. During the opening, power is delivered from the mobile phone to the self-powered digital lock via NFC, NFC WLC or Qi.

In one developed application of the invention, the mix of 3$^{rd}$ party lock app-based openings and digital mobile wallet-based openings is used to create a digital self-powered locking solution. In this system some users still have the app of the lock provider on their phone. The lock provider instructs his proprietary app to both power the digital lock opening, but also to charge the self-powered lock capacitor a little bit by releasing more energy in the proprietary app based digital opening, than is actually required by the instant lock opening.

When the next person comes along with a digital mobile wallet, and opens the lock with the key from the mobile digital wallet, the earlier provided excess energy is used to power the lock opening in this situation, where no power from the mobile phone with the digital wallet is released at all.

The excess energy is typically stored in a capacitor or so-called supercapacitor.

A hybrid energy harvesting digital lock is in accordance with the invention and characterised in that the lock is a self-powered lock,

- the lock is opened using a mobile app which sends an NFC signal with a virtual key to open the lock,
- the said app originated NFC signal powers the lock opening,
- the said app originated NFC signal contains an excess residual energy which is stored in the lock,
- said excess residual energy is used in powering the opening of the lock when the virtual key is sent from a mobile wallet with NFC, and the power transmission from the mobile wallet NFC signal is insufficient to power the lock opening.

A mobile station configured to interact with a hybrid energy harvesting digital lock is in accordance with the invention and characterised in that the lock is a self-powered lock, the lock is opened using a mobile app which sends an NFC signal with a virtual key to open the lock, the said app originated NFC signal powers the lock opening, the said app originated NFC signal contains an excess residual energy which is stored in the lock, said excess residual energy is used in powering the opening of the lock when the virtual key is sent from a mobile wallet with NFC, and the power transmission from the mobile wallet NFC signal is insufficient to power the lock opening.

Also, in some embodiments of the invention the mobile digital wallet is more advanced in the mobile station to deal with self-powering locks. In one embodiment, the mobile station has a mobile digital wallet application integrated into the operating system, which mobile digital wallet application is capable of distinguishing between two authentications:

NFC payments, and

NFC transmissions providing access to a physical space.

A mobile station with a mobile digital wallet cloud application is in accordance with the invention and characterised in that, the mobile wallet application sends a virtual key to a self-powered digital lock, the mobile wallet application identifies a non-payment virtual key transmission configured to open a digital lock, the mobile wallet adds an NFC power transmission to the non-payment virtual key transmission, the added NFC power transmission is configured to power the opening of the self-powered lock with the transmitted non-payment virtual key transmission.

A self-powered digital lock configured to be opened by a mobile station with a mobile digital wallet cloud application is in accordance with the invention and characterised in that, the mobile wallet application sends a virtual key to a self-powered digital lock, the mobile wallet application identifies a non-payment virtual key transmission configured to open a digital lock, the mobile wallet adds an NFC power transmission to the non-payment virtual key transmission, the added NFC power transmission is configured to power the opening of the self-powered lock with the transmitted non-payment virtual key transmission.

In one embodiment energy harvesting of the self-powered lock is prioritised. In this embodiment the self-powered lock recognises different physical and virtual key types after a sufficient energy threshold has been achieved or maintained. If the key type is a mobile wallet virtual key or K5 key, where one would not expect a power transmission, the self-powered lock changes its NFC mode tag mode to reader/writer mode. This consumes some energy from the lock. If the key type is mobile wallet virtual key, the lock starts by reading access credentials from the digital mobile wallet via NFC. However, if the key type is K5, then normal authentication protocol takes place.

A self-powered digital lock is in accordance with the invention wherein energy harvesting is done as a first operation before any kind of communication takes place, after the lock has harvested enough energy, the lock recognizes the key type, from any of the following: traditional key, mobile application, iLOQ app, K55 key fob or K5 key or mobile wallet virtual key, and then if the type is mobile wallet virtual key or K5 key the lock changes its NFC mode from tag mode to reader/writer mode, if the key type is mobile wallet virtual key, the lock starts by reading access credentials from the mobile wallet, and if the key type is K5, then normal authentication protocol takes place.

In some embodiments, the invention is realised by a new mobile station and a new mobile station operating system that has distinguished cloud applications for the wallet and keys. The wallet app will hold payment cards and manage financial NFC transactions. The keys app will manage authentications into physical spaces and NFC transactions with physical locks, self-powered or battery powered, or externally powered.

A mobile station with a mobile wallet cloud application is in accordance with the invention and the mobile wallet application comprises payments, member cards and other non-powered NFC interactions and is characterised in that, a mobile keys application sends a virtual key to a self-powered digital lock, the mobile keys application adds an NFC power transmission to the virtual key transmission, the added NFC power transmission is configured to power the opening of the self-powered lock with the transmitted virtual key transmission.

A self-powered digital lock is in accordance with the invention and characterised in that energy harvesting is done as a first operation before any kind of communication takes place, after the lock has harvested enough energy, the lock recognizes the key type and then, if the type is mobile wallet digital virtual key the lock changes its NFC mode from tag mode to reader/writer mode, if the key type is mobile wallet digital virtual key, the lock starts by reading access credentials from the mobile wallet.

A self-powered digital lock is in accordance with the invention and characterised in that energy harvesting is done as a first operation before any kind of communication takes place, after the lock has harvested enough energy, the lock starts BLE and recognizes the key type and then, if the type is mobile wallet digital virtual key the lock maintains its NFC mode as tag mode, the mobile wallet digital virtual key is read via BLE, if the mobile wallet digital virtual key access rights allow the opening of the lock, the lock is opened.

Additionally, some or all of the aforementioned locks and mobile stations may communicate the digital key via Bluetooth Low Energy (BLE) or UWB Ultra Wideband. These have a longer range than NFC.

Also additionally, in some embodiments the digital key can also be communicated from a metal key. One example is the iLOQ K5 key. The K5 key can be used to power the self-powered lock kinetically, by inserting the key in the keyhole of the lock. The self-powered lock is then typically in tag mode, and receives the power transmission from the translational mechanical insertion of the key ultimately powered by the user's muscles. It is also in accordance with the invention to harness rotational movement of the key, such as the turning of the key, or both rotational and translational movement of the key, i.e. the insertion and/or withdrawal and/or turning of the key in any combination or permutation.

It is also in accordance with the invention that the digital self-powered lock has an ambient light photovoltaic cell. An ambient light photovoltaic cell is a specialized solar cell designed to convert low-level, diffuse light sources-like indoor lighting or shaded outdoor areas-into electricity. One example of an ambient light solar cell could be a silicon solar cell if the ambient light photon energy matches the band gap of the silicon solar cell diode. Many times, this is not the case, and the energy of an indoor light mismatches the band gap of the photovoltaic silicon solar cell. Ambient light photovoltaic cells that have band gaps having a meaningful match with the ambient light photon energy may include any of the following: perovskite photovoltaic cell, organic photovoltaic cell (e.g. from Epishine corporation), Dye Sensitized photovoltaic cell (e.g. from Ambient corporation) and indye Indoor photovoltaic cell in accordance with the invention. In one inventive approach, the self-powered lock is equipped with a photovoltaic cell that is as wavelength agile and powerful as possible in different environments, including outdoors/indoors and night/day. One example of this type of photovoltaic cell is the ultra-high efficiency advanced triple-junction (ATJ) solar cell, for example the InGaP/InGaAs/Ge photovoltaic cell from Emcore Corporation, which has reached a conversion efficiency of 27,5% in solar light conditions.

It is in accordance with the invention to realise the self-powering part of the digital lock, wholly or partially, with a photovoltaic cell, which is typically an ambient photovoltaic solar cell if the self-powered lock is indoors. This makes it possible to get rid of the excess energy collected from the NFC power transmissions in some embodiments. In one embodiment the self-powering part of the lock is done with an NFC power transmission for those lock users who can transmit NFC power, but without excess energy. The energy for those NFC users who do not provide a power transmission and for BLE users is derived from a photovoltaic cell or from kinetic energy from the muscles of the user.

In one preferable embodiment, the NFC, BLE and/or UWB devices in the self-powered digital lock are kept in deep sleep to minimize power consumption, but woken up with a capacitive sensor, when these NFC, BLE and/or UWB devices need to be used.

In practice, the capacitive sensor keeps all electrical devices in the sleep state when there is nothing in proximity of the lock. When for example a user approaches the lock, the capacitive sensor can detect the presence of the user without physical contact, i.e. only from the change in the electric field. When the user is detected in proximity of the self-powered lock by the capacitive sensor, the electric devices necessary for the opening and/or closing of the self-powered lock are woken up from the sleep state. One example of capacitive sensors is the CAPSENSE™ product range from Infineon Corporation, or capacitive sensors from Micro-epsilon Corporation.

Some or all of the aforementioned advantages of the invention are accrued with the aforementioned technologies, which allow the use of self-powered locks by all or some consumers, without a dedicated application from the lock manufacturer in some embodiments. Or expand the app-based use of the self-powered lock to lock manufacturer app+mobile digital wallet hybrid configurations, where both aforementioned apps can be used. The invention is simpler, as the consumer can open the lock from his mobile wallet application, or with a separate Keys application. The invention also reduces the end cost to the consumer, because self-powered locks typically present life-time financial savings to consumers.

In addition, and with reference to the aforementioned advantage accruing embodiments, the best mode of the invention is considered to be the embodiment where the inventive lock recognizes fobs, virtual keys and app-based openings.

In the best mode of the invention, the energy harvesting would be done as a first operation before any kind of communication takes place. After the lock has harvested enough energy, it recognizes the key type i.e. whether it is an iLOQ key (iLOQ app, K55 key fob or K5 key) or a mobile digital wallet application virtual key, and then if the type is wallet virtual key or K5 key it changes its mode from tag mode to reader/writer mode. If the key type is digital mobile wallet, communication is started by reading access credentials from digital mobile wallet. If the key type is K5 then the normal iLOQ authentication protocol takes place. This procedure enables the use of all kinds of keys in same self-powered digital lock product in the best mode of the invention.

BRIEF DESCRIPTION OF THE DRAWINGS

In the following the invention will be described in greater detail with reference to exemplary embodiments in accordance with the accompanying drawings, in which FIG. 1 demonstrates an embodiment 10 of the inventive hybrid energy harvesting digital lock openable with a mobile device as a block diagram.

Some of the embodiments are described in the dependent claims.

DETAILED DESCRIPTION OF EMBODIMENTS

Figure 1:
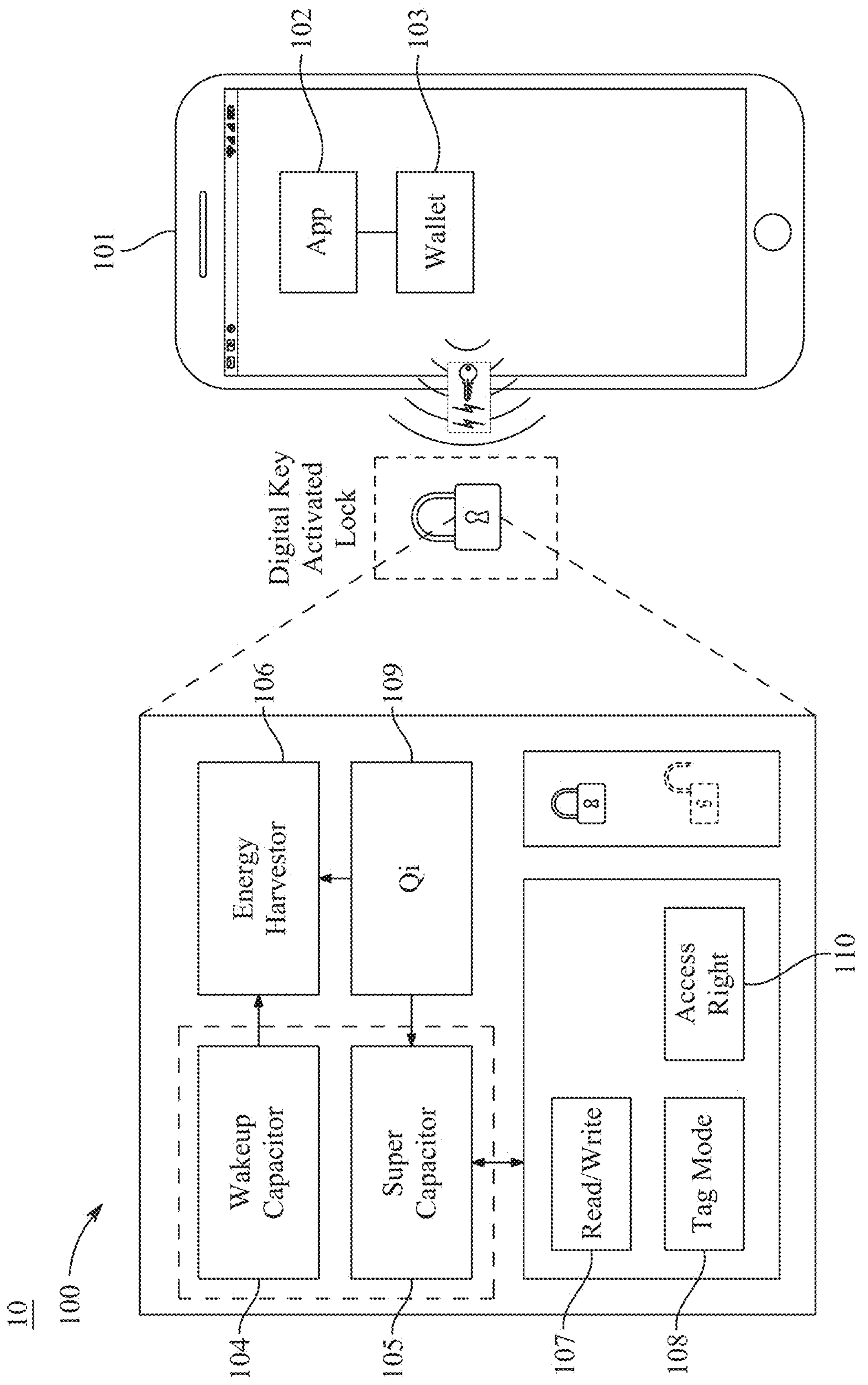

FIG. 1 displays a hybrid energy harvesting digital lock 100 openable with a mobile station 101. The mobile station 101 may be configured as a mobile terminal computer, typically a smartphone and/or a tablet or a like that is used by the user using operating software applications installed on the smartphone, etc. The mobile station 101 is typically a mobile smartphone, such as iOS, Android, FireOS, a Windows Phone smartphone or any other mobile smartphone capable of executing applications.

However, it is also possible that the mobile station 101 is a mobile phone or a computer, such as a PC-computer, Apple Macintosh-computer, PDA-device (Personal Digital Assistant). The mobile station 101 could further be a device having an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system. The mobile station 101 is typically connected to the cloud, such as iCloud, Google cloud or the like.

The lock 100 is a self-powered lock with energy harvestor 106, typically harvesting energy from NFC transmissions or Qi. Examples of self-powered locks include the iLOQ S50 products. These comprise locks with oval cylinders, locks with DIN cylinders, locks with ANSI cylinders, padlocks, furniture locks, key storage cylinders, and the like.

The self-powered lock 100 is opened using a mobile app 102, typically written and produced by the manufacturer of the self-powered lock 100, which sends a virtual key to open the self-powered lock 100 either via NFC or Bluetooth Low Energy or both. Alternatively, power is transmitted from mobile station 101 to the self-powered lock 100 wirelessly via Qi in some embodiments.

Subsequently, the said app 102 originated NFC or Qi signal powers the lock 100 opening. For clarity, a Bluetooth signal cannot power the lock. In some embodiments the said app 102 originated NFC or Qi signal contains an excess residual energy which is stored in the lock, usually by the energy harvestor 106 passing the excess energy to at least one capacitor (104, 105). In some embodiments the digital self-powered lock 100 comprises a wake-up power capacitor 104, optionally made of Tantalum, and a supercapacitor 105 for processing power. The wake-up power capacitor 104 typically acts as a lightning-fast energy reserve for devices with high, sudden power demands. Opening of the lock may represent a sudden power demand that may need to be satisfied with no delay at all, and in those embodiments the wake-up capacitor 104 is understood to be useful in reducing latency. Other alternatives for excess residual energy storage include Hybrid Layer Capacitor (HLC) and Lithium-ion capacitor (LIC), which are preferable because of their very slow discharge rates. HLC and LIC have a slower discharge rate than the aforementioned capacitors 104, 105.

The said excess residual energy, usually stored in capacitors (104, 105) is used in powering the opening of the lock 100 when the virtual key is sent from a digital mobile wallet 103 with NFC, and the power transmission from the mobile wallet NFC signal is zero or insufficient to power the self-powered lock 100 opening. Then the self-powered digital lock 100 responds to the digital mobile wallet 103 virtual key in read/write mode, reading the wallet virtual key without a power transmission from the mobile station 101.

However, this is in contrast to typically the digital self-powered lock 100 responding to the mobile app 102 virtual key in tag mode, reading the app 102 virtual key and receiving a wireless power transmission from the mobile station 101.

The virtual key typically contains access rights related to the opening of the digital self-powered lock, and if the access rights provide the user the access to open the digital self-powered lock, the digital self-powered lock is opened, otherwise the digital self-powered lock is kept closed.

The energy transmitted from the mobile station 101 to the digital self-powered lock 100 is stored in the lock typically with a supercapacitor 105, regardless of whether the energy arrives to the lock 100 via NFC, NFC WLC and/or Qi, or any combination of the aforementioned.

The digital self-powered lock 100 of the invention can be operated with different types of keys, including any of the following: a key fob, a mobile application, a proprietary mobile application, a designated smart key, or a mobile digital wallet virtual key, and/or a traditional metal key.

In addition to NFC, the digital self-powered lock 100 and the mobile station 101 may communicate the digital key from the mobile station 101 to the self-powered lock 100 via BLE Bluetooth Low Energy or Ultra Wideband UWB to open the lock. For example, the digital key may be read from the Wallet Application via Bluetooth Low Energy BLE, or Ultra Wideband UWB.

Ultra Wideband UWB is a radio technology that operates on a wide frequency band, e.g. 1-2 GHz. In UWB short low power pulses are typically transmitted. The range is typically 10-20 meters for 110 Mb/s and 2-4 meters for data speed of about 480 Mb/s.

The earlier mentioned excess residual energy, usually stored in capacitors (104, 105) can also be used in powering the opening of the lock 100 when the virtual key is sent from a digital mobile wallet 103 via BLE and/or UWB, and there is no power transmission from the mobile station 101. Then the self-powered digital lock 100 responds to the digital mobile wallet 103 virtual key in read/write mode, reading the wallet virtual key without a power transmission from the mobile station 101 via BLE and/or UWB.

It should be noted that reading the digital key via BLE and/or UWB from the mobile station 101 is likely to consume less time from the self-powered digital lock 100 than charging the lock via NFC and reading the digital key via NFC, and therefore is likely to be preferred by the consumers.

In one embodiment both BLE or UWB and NFC are used to open the lock. It is for example in accordance with the invention to communicate all or almost all access information (for example handshakes) via BLE or UWB first, and then finalise the opening of the lock 100 by doing an NFC tap with the lock 100. Splitting the communication into both channels BLE and NFC is especially preferable when the mobile station 101 does not have all necessary BLE functions for a secure lock opening or the desired features in the Aliro protocol. The Aliro protocol is an industry-standard communication protocol for secure digital access, developed by the Connectivity Standards Alliance (CSA).

However, in some embodiments it is not even necessary to take the mobile station out of the user's pocket. UWB or BLE 6.0 and channel sounding can be used to establish that the user is close to the self-powered digital lock 100. If the access right allowing the opening of the self-powered digital lock 100 is communicated via UWB or BLE, or both in its entirety, there will be no need for an NFC tap. The self-powered digital lock 100 lock can be opened as the user with the access right to open the self-powered digital lock 100 approaches said lock, for example to within a range of 2-4 meters from the self-powered digital lock 100 and door.

In some embodiments UWB is not used as a communication channel like BLE. Instead, UWB is used to measure the location of the user precisely and make the opening of the self-powered digital lock 100 more secure. Similarly, the Channel Sounding feature in BLE 6.0 can be used to measure the location of the user more precisely, by angle of arrival, range etc. In some embodiments UWB and/or BLE 6.0 Channel Sounding are used to locate the user so precisely that the lock is automatically opened to the user, when he is for example 2 meters from the lock. In preferable embodiments this will happen automatically with no user action at all, i.e. the user does not need press an "open" button from the app 102 in the mobile station 101. The user can simply walk through doors, whose locks automatically open, in a building without touching his mobile station 101 at all.

Any features of embodiment 10 may be readily combined or permuted with any of the other embodiments 20, 30, 40, 50, 60, 70, 80, 90 and/or 91 in accordance with the invention.

Figure 2:
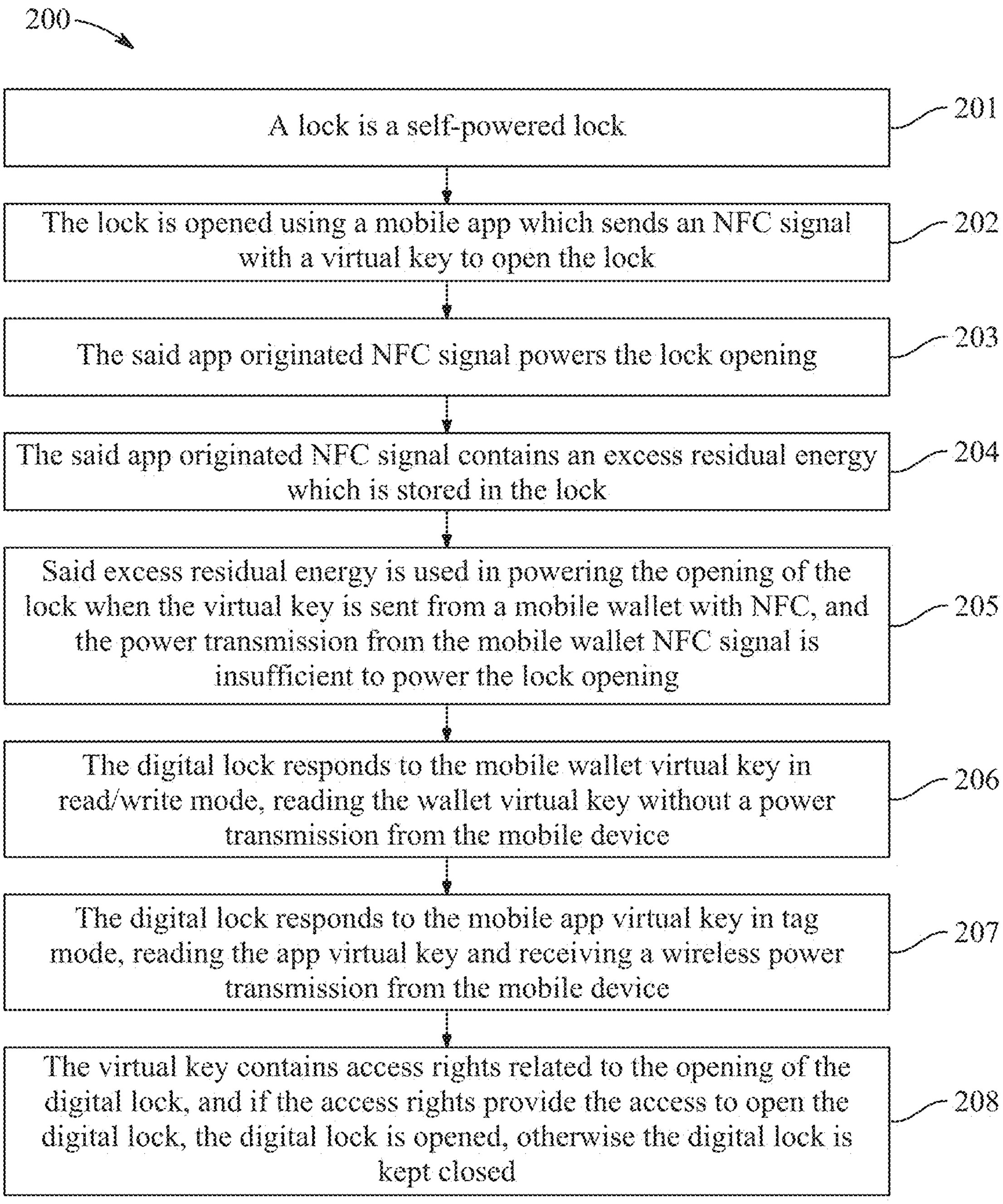
FIG. 2 demonstrates an embodiment 20 of the method of use of the hybrid energy harvesting digital lock openable with a mobile device in accordance with the invention as a flow diagram.

FIG. 2 shows the operation of the self-powered digital lock 100 and the mobile station 101 as a flow diagram, starting from phase 201 where the lock is a self-powered lock.

In phase 202 the lock 100 is opened using a mobile app 102 which sends an NFC signal with a virtual key to open the lock 100.

In phase 203 the said mobile app 102 originated NFC signal powers the lock opening. The mobile app 102 is typically an Android or iOS app produced by the lock manufacturer. In some embodiments the mobile app 102 may initiate power transfer by Qi from the mobile station 101 to the lock 100.

It should be noted that the order of the phases 202 and 203 may also be reversed. When there is residual energy in the lock, the NFC signal can be sent and detected prior to powering, and the power signal may follow later. However, if the lock 100 has no power left, it is necessary to first power the lock 100 by sending an NFC power transmission as in phase 203, and only after that may a virtual key be sent as in phase 202.

Further, some embodiments utilise NFC WLC (Wireless charging) Capability, where the lock has an NFC circuit that operates in a powerless state, for example as a passive NFC-tag. This makes it possible that the mobile station 101 recognises the lock 100, without the lock 100 having any active power. When the NFC circuit comprises the WLC Capability-parameter, in accordance with the NFC Forum Wireless Charging Specification, the mobile station 101 can read and identify that the lock 100 supports WLC-charging. When this happens, the mobile station 101 may initiate so-called 'handshakes' in accordance with the WLC-protocol. After this handshake the lock 100 is capable of charging itself more and/or faster by receiving power wirelessly, than it otherwise would, without using WLC-protocol.

In phase 204 the said app originated NFC signal, NFC WLC signal or Qi signal contains an excess residual energy which is stored in the lock 100. The excess residual energy is the energy that is in excess of the energy needed to power the current lock opening. This excess energy becomes residual energy and is stored in the lock 100 capacitors (104, 105) in some embodiments.

In the NFC WLC alternative, when the lock 100 has charged itself sufficiently and reached a certain charge level, the lock changes its operational state to NFC Reader/Writer mode.

In phase 205 said excess residual energy is used in powering the opening of the lock 100 when the virtual key is sent from a mobile wallet app 103 with NFC, and the power transmission from the digital mobile wallet app 103 NFC signal is zero or insufficient to power the lock 100 opening.

In phase 206 the digital lock responds to the mobile wallet app 103 virtual key in read/write mode, reading the wallet digital virtual key without a power transmission from the mobile station 101.

In the NFC WLC alternative, in the Reader/Writer state the lock 100 can read the digital virtual key from the Mobile Wallet application without receiving a power transmission, and if the digital key is valid, the lock opens.

In phase 207 the digital lock responds to the mobile app 102 virtual key in tag mode, reading the mobile app 102 digital virtual key and receiving a wireless power transmission from the mobile station 101.

In phase 208 The virtual key contains access rights related to the opening of the digital self-powered lock, and if the access rights provide the access to open the lock, the digital lock is opened, otherwise the digital self-powered lock is kept closed.

Since the different phases 206 and 207 both provide the lock 100 opening, but only phase 207 or NFC WLC charging powers the lock 100 and provides excess residual energy, the distribution of the two different types of openings 206, 207 and NFC WLC charging needs to be maintained so that the excess residual energy is sufficient to power the lock openings of phase 206. If there are too many non-charging lock 100 opening events, the lock 100 will run out of power.

Any features of embodiment 20 may be readily combined or permuted with any of the other embodiments 10, 30, 40, 50, 60, 70, 80, 90 and/or 91 in accordance with the invention.

Figure 3:
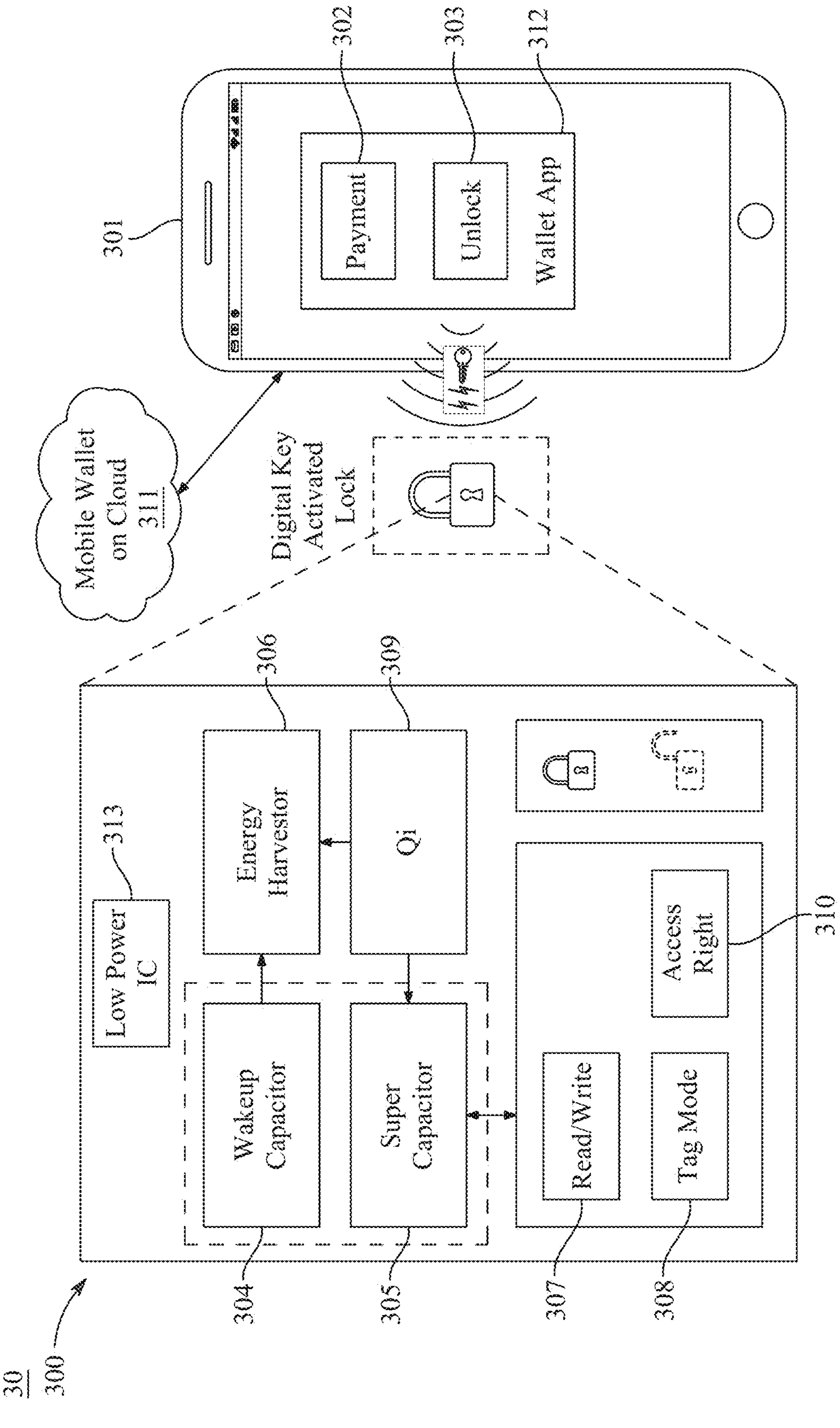
FIG. 3 demonstrates an embodiment 30 of a mobile station with a mobile wallet cloud application in accordance with the invention as a block diagram.

FIG. 3 discloses a mobile station 301 with a cloud server network 311 hosting the digital mobile wallet and configured to open the digital self-powered lock 300.

The cloud server network 311 connects to the mobile station 301 via a communication network 220. The cloud server network 311 may comprise a CPU and/or GPU or multiple CPUs and/or GPUs. The communication network used for the communication in the invention is the wireless or wireline Internet or the telephony network, which is typically a cellular network such as UMTS-(Universal Mobile Telecommunication System), GSM-(Global System for Mobile Telecommunications), GPRS-(General Packet Radio Service), CDMA-(Code Division Multiple Access), 3G-, 4G-, 5G-, Wi-Fi and/or WCDMA (Wideband Code Division Multiple Access) network.

In an example, the cloud server network 311 may comprise a plurality of servers (not shown). In an example implementation, the cloud server network 311 may be any type of a database server, a file server, a web server, an application server, etc., configured to store data related to the digital self-powered locks 100, 300 and/or other applications 102, 103, 302, 312. The cloud server network 311 may also comprise a plurality of databases for storing the data files. The databases may be, for example, a structured query language (SQL) database, a NoSQL database such as the Microsoft® SQL Server, the Oracle® servers, the MySQL® database, etc. The cloud server network 311 may be deployed in a cloud environment managed by a cloud storage service provider, and the databases may be configured as cloud-based databases implemented in the cloud environment.

Due to the self-learning or machine learning aspects being available in the cloud also a neural network type of implementation for the mobile station 300 and/or the cloud server network 311 is possible.

The cloud server network may include an input-output device such as a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server network 311 of the invention. The cloud server network 311 can be purchased as a separate solution from known vendors such as Microsoft, Amazon and/or HP (Hewlett-Packard). The cloud server network 311 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage or High Bandwidth Memory (HBM). This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server network 311 is preferred despite its high cost due to the reduced latency it provides.

The GPU may refer to an electronic circuit designed to manipulate and alter computer graphics, images, and memory to accelerate the analysis and creation of images/patterns. GPUs can be used in embedded systems, mobile phones, personal computers, workstations, game consoles, etc. The GPU for some embodiments of the invention may be selected, for example, from AMD GPUS, Nvidia GPUs, Intel GPUs, Intel GMA, Larrabee, Nvidia Pure Video, SoC, etc. In the invention, typically the machine learning or Artificial Intelligence parts of the processing are configured to be executed by the GPU, due to the large number of parallel processing or comparative processing required in machine learning.

The mobile station 301 has a mobile wallet cloud application 311, and the mobile wallet application 312 sends a virtual key to a self-powered digital lock 300.

The mobile wallet application identifies a non-payment virtual key transmission 303 configured to open a digital lock via NFC. The mobile wallet 312 then adds an NFC power transmission to the non-payment virtual key transmission 303.

The added NFC power transmission is configured to power the opening of the self-powered lock 300 with the transmitted non-payment virtual key transmission 303, and the NFC power is received by the energy harvestor 306. The energy harvestor 306 typically distributes the received energy to the lock 300 opening, and stores any excess energy to capacitors 304, 305. In some embodiments instead of NFC, Qi power transmission from the mobile station 301 is used. In some embodiments of the invention both NFC and Qi power transmission can be used in a mix. The mobile station 300 is configured to send power wirelessly via NFC and/or Qi, usually to a supercapacitor 305 in the digital self-powered lock 300.

In some embodiments the digital self-powered lock 300 comprises an Ultra Low Power IC 313, with wake-up power capacitor 304, optionally made of Tantalum, and a supercapacitor 305 for processing power. The wake-up capacitor 304 and the supercapacitor 305 may be realised as separate components or may be integrated into a Low Power IC (Integrated Circuit) 313. Both implementation alternatives are possible, as well as integrating just Wakeup capacitor 304, or the Supercapacitor 305 on the Low Power IC 313. The wake-up power capacitor 304 typically acts as a lightning-fast energy reserve for devices with high, sudden power demands. Opening of the lock 300 may represent a sudden power demand that may need to be satisfied with no delay at all, and in those embodiments the wake-up capacitor 304 is understood to be useful in reducing latency.

The digital virtual keys are sectioned into section 303 in the Wallet App 312, as these virtual keys authenticate entry into physical spaces.

Thus, the digital self-powered lock 300 responds to the mobile wallet 312 virtual key in NFC tag mode, reading the wallet virtual key and receiving a wireless power transmission from the mobile station 301.

In those situations where for some reason the mobile station 301 is unable to provide a power transmission via NFC or Qi, the digital self-powered lock 300 responds to the mobile wallet digital virtual key in read/write mode, reading the wallet virtual key without a power transmission from the mobile station 300.

In preferable embodiments the digital virtual key contains access rights related to the opening of the digital self-powered lock 300, and if the access rights provide the access to open the lock 300, the digital lock is opened, otherwise the digital lock 300 is kept closed.

Any features of embodiment 30 may be readily combined or permuted with any of the other embodiments 10, 20, 40, 50, 60, 70, 80, 90 and/or 91 in accordance with the invention.

Figure 4:
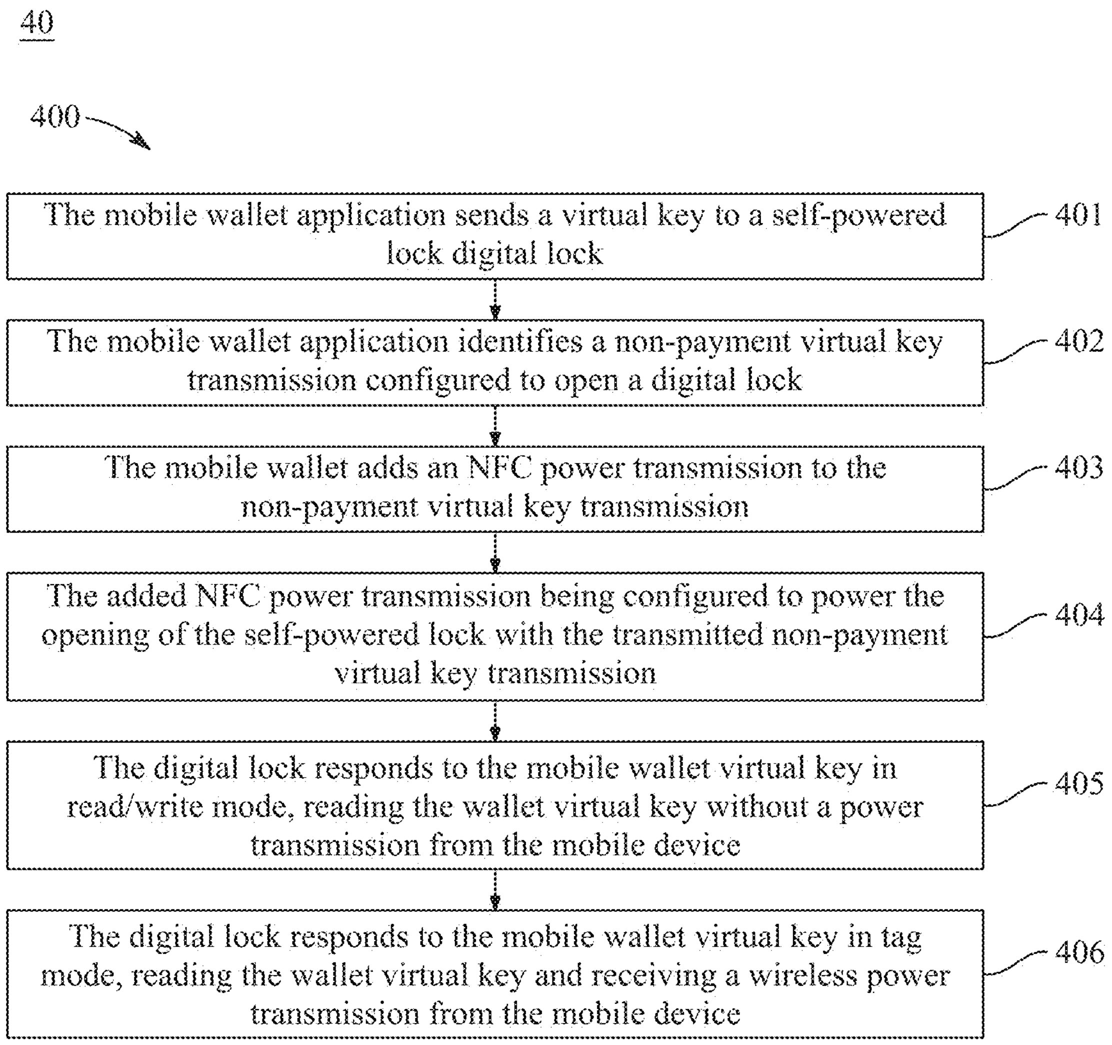
FIG. 4 demonstrates an embodiment 40 of the method of use of a mobile station with a mobile wallet cloud application in accordance with the invention as a flow diagram.

FIG. 4 discloses the operation of the cloud server network 311, mobile station 301 and the digital self-powered lock 300 as a flow diagram. In phase 401 the mobile wallet application 312 sends a virtual key to a self-powered digital lock 300.

In phase 402 the mobile wallet application 312 identifies a non-payment virtual key transmission configured to open a digital lock 300. In phase 403 the mobile wallet app 312 adds an NFC power transmission to the non-payment virtual key transmission, but in some embodiments, it may add a Qi transmission, or a power transmission via Qi and NFC both.

In phase 404 the added NFC and/or Qi power transmission is configured to power the opening of the self-powered lock 300 with the transmitted non-payment virtual key transmission.

In phase 405 the digital lock 300 responds to the mobile wallet virtual key in read/write mode, reading the wallet virtual key without a power transmission from the mobile station 301. This phase is useful if there is some failure in power transmission.

In phase 406 the digital lock 300 responds to the mobile wallet virtual key in tag mode, reading the wallet virtual key and receiving a wireless power transmission from the mobile station via NFC, Qi or both.

Any features of embodiment 40 may be readily combined or permuted with any of the other embodiments 10, 20, 30, 50, 60, 70, 80, 90 and/or 91 in accordance with the invention.

Figure 5:
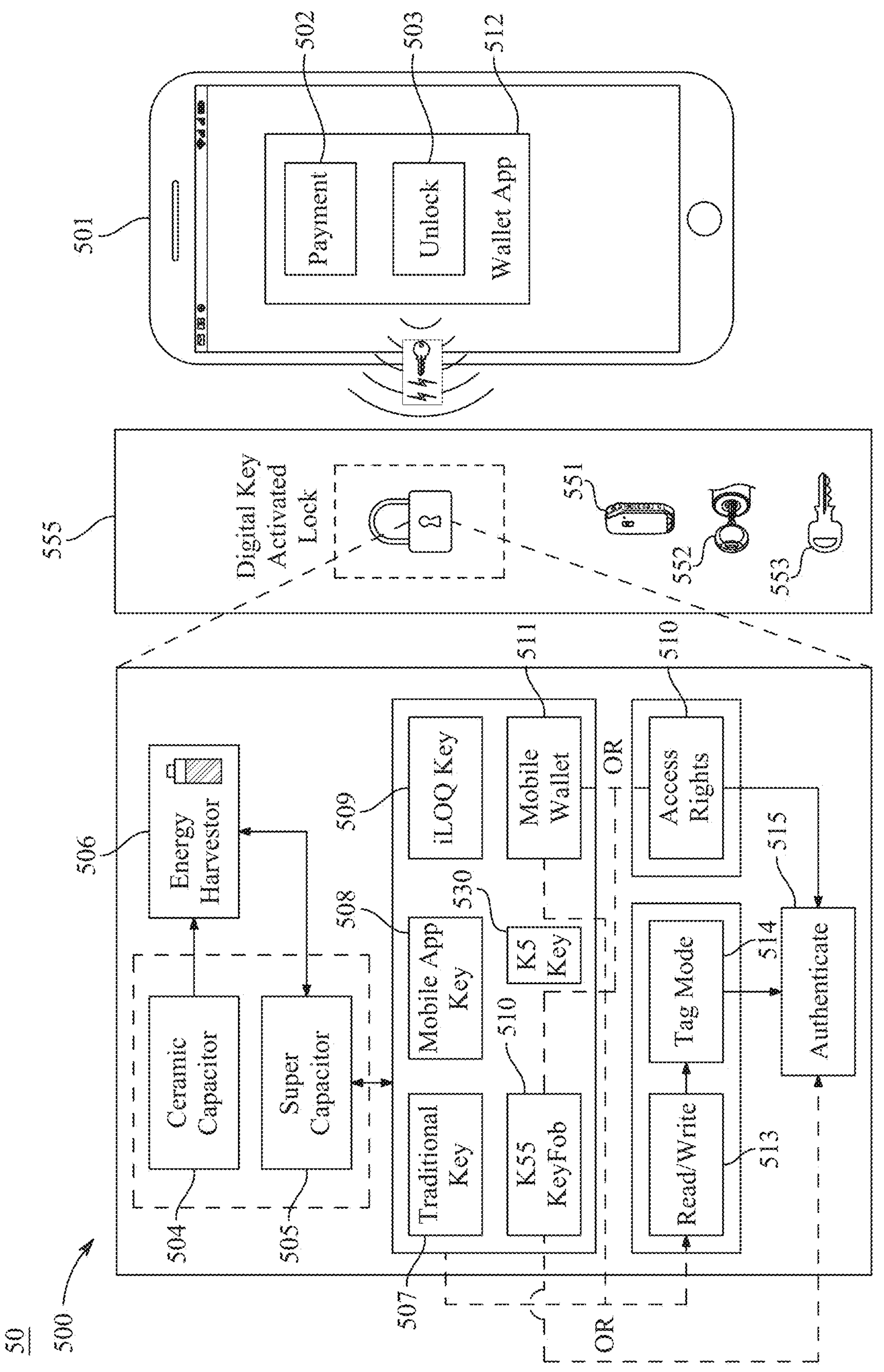
FIG. 5 demonstrates an embodiment 50 of the inventive self-powered digital lock openable with a mobile device as a block diagram.

FIG. 5 shows a digital self-powered lock 500 of the applicant that features a plurality of access technologies 507, 508, 509, 510, 511, 530 some of which are based on using a mobile station 501. By a traditional key 553, 507, we mean an old-fashioned metal key that is inserted into a keyhole. By a Mobile App Key 508 we mean a mobile app from a lock manufacturer, which mobile app can provide a digital key to the lock 500. By a K5 key 552 we mean a key that has an NFC chip that operates in tag mode, that accesses the lock using access technology 530 which is a mechanical keyhole and a communication interface that can accept virtual digital key from the K5 key. In the iLOQ product suite, K5 is the K5S digital key for the iLOQ S5 locking system.

By a K55 Key Fob 551 we mean NFC enabled key with a battery, which can operate in both tag and read/write modes, and thus the K55 Key Fob may power the lock. The Access technology 510 can thus accept the virtual digital key with or without a power transmission. In the iLOQ product suite K55 is the K55S Rechargeable digital key fob for the iLOQ 5 Series locking system.

By a mobile wallet 511 we mean a mobile wallet app integrated with the operating system of the mobile phone. By an iLOQ key 509 we mean a digital key from the Applicant, who is also a lock manufacturer. For example, K5 key 552 is a species of an iLOQ key 509.

Usually, energy harvesting is done as a first operation before any kind of communication takes place between the lock 500 and the mobile station 501. After the lock has harvested enough energy, the lock recognizes the key type, from any of the following access technologies: traditional key 507, mobile application 508, iLOQ app 509, K55 key fob or K5 key 510 or mobile wallet 511 virtual key. So, in this embodiment, when the self-powered lock is made by the applicant iLOQ, the iLOQ app key 509 is recognised, but it is also possible to recognise a virtual digital key from an app 508 of another app/key provider. This app provider could perhaps be a competing lock company ensuring inter compatibility of locks and keys in some special embodiments.

If the type is mobile wallet 511 virtual key or K5 key 530 the lock changes its NFC mode from tag mode to reader/writer mode.

- if the key type is mobile wallet virtual key, the lock starts by reading access credentials from the mobile wallet 512, and
- if the key type is K5, then normal authentication protocol takes place.

Otherwise, power is transmitted from the mobile station 501 to the digital self-powered lock 500 wirelessly via NFC or Qi or electromechanically with the traditional key 507. For example, by harnessing the mechanical energy in turning the traditional key in the lock 500.

The virtual key typically contains access rights related to the opening of the digital lock 500, and if the access rights provide the access to open the digital self-powered lock 500, the digital lock 500 is opened, otherwise the digital lock 500 is kept closed.

The energy transmitted from the mobile station 501 to the digital lock 500 is stored in the digital lock 500 with a supercapacitor 505 in preferred embodiments. In some embodiments the digital self-powered lock 500 does not need an Ultra Low Power IC or a wake-up power capacitor.

Instead, harvested power is stored in ceramic capacitors 504 and a supercapacitor 505 in accordance with the invention.

Any features of embodiment 50 may be readily combined or permuted with any of the other embodiments 10, 20, 30, 40, 60, 70, 80, 90 and/or 91 in accordance with the invention.

Figure 6:
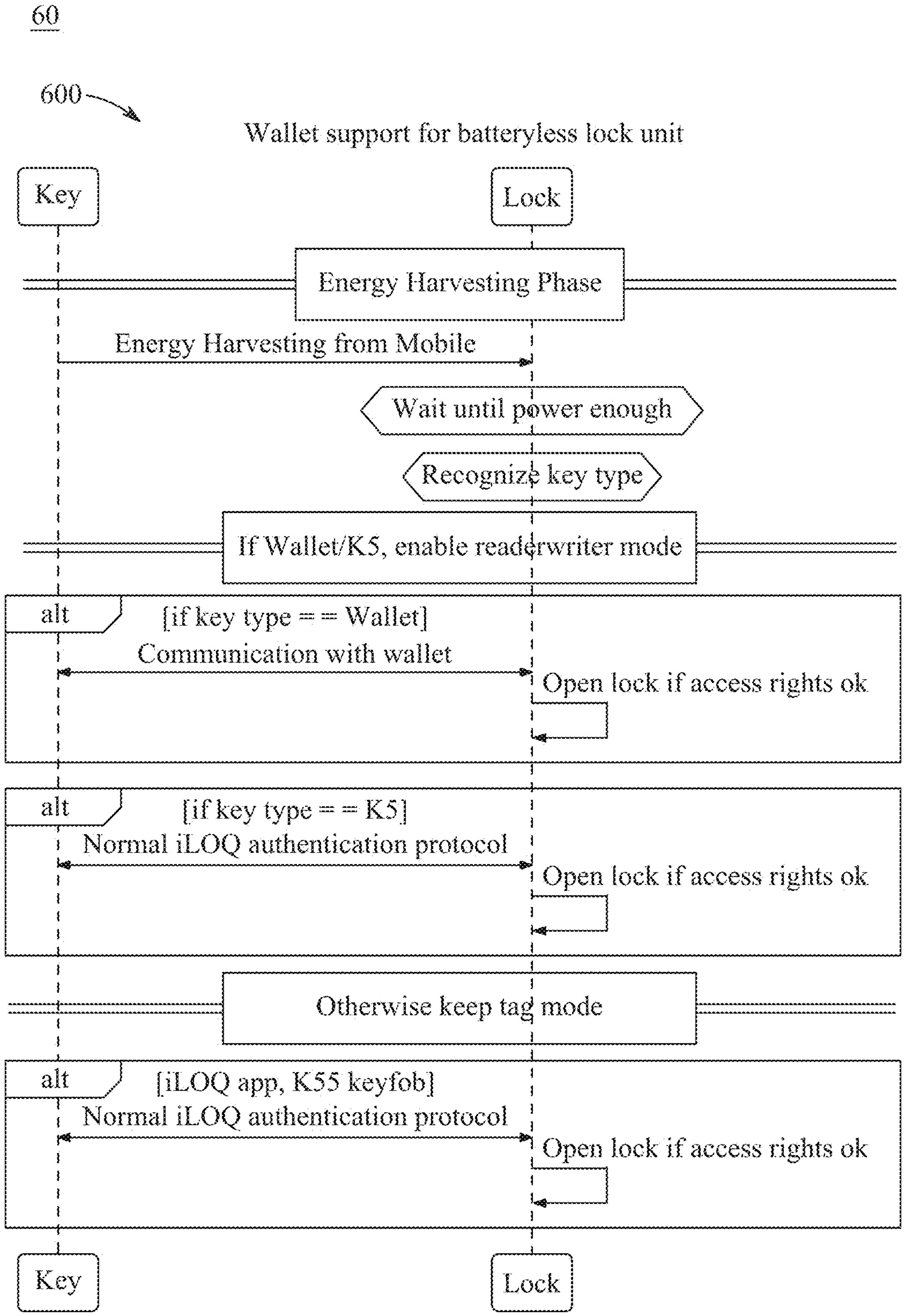
FIG. 6 demonstrates an embodiment 60 of the method of use of the self-powered digital lock openable with a mobile device in accordance with the invention as a flow diagram.

FIG. 6 displays the operation of the system embodiment 50 as a method embodiment 60 in a flow diagram. Moving from top of page to bottom of page, first there is the energy harvesting phase, until there is enough power. The key type is recognized. If the type is Wallet/K5, reader/writer mode is enabled. If the key type is Wallet, there is communication with the digital wallet, and the lock is opened if access rights are OK. If the key type is a K5, normal iLOQ authentication is carried out. Normal authentication, as outlined in the below, is usually done with all key types, as access rights need to be inspected regardless of the type of the key.

In an exemplary normal key-lock authentication process, the key is first provided for a lock. The lock then harvests energy from the key insertion. Then there is mutual phone key and lock authentication. The lock checks if the key belongs to its system. If not, the opening process is suspended, and no event log is generated. This prevents overwriting valid key audit trails with subsequent opening attempts using a foreign key. If yes, the lock synchronizes system-level parameters from the key. These may include the latest blocklist or the latest time stamp. Then typically the key data is validated. If the key is not on the blocklist, has valid access rights, and a valid access time, access is granted. Otherwise, access is denied.

Then an audit trail is written. The lock logs key events to an internal audit trail (e.g. 500 entries). If access is granted, it records the key access. If access is denied, the failure reason is logged, e.g. invalid rights, restricted times, or blocked key. Typically, all event logs record the key ID and the event timestamp. The key ID is matched with the key holder in the cloud service. Then the lock is mechanically or electromagnetically opened. After that, an audit trail is sent to phone key and the cloud. The lock encloses the key event log in a single audit trail package that it sends to the key, which then forwards it to the cloud. If the phone key is offline, it stores the audit trail package in its internal database and sends it to the cloud when back online.

This normal authentication can also be used with all other keys such as iLOQ app, K55 key fob and the like, which operate in tag mode.

Post-checking that the access rights are ok, and opening the lock if yes, the lock can return to a no power state.

There is also one extremely low power lock opening method in accordance with the invention, which uses BLE. It is in accordance with the invention that the energy harvesting is conducted to the point where there is sufficient energy for BLE activation only. This required energy is very low. Upon receiving the required BLE activation energy, the virtual digital key is communicated via BLE, and the lock is opened if the access rights of the virtual digital key grant access. All this time, the lock is kept in tag mode. This lock opening consumes only the BLE energy+lock opening energy, and the sum of these energies can be made very low.

More energy would be required if the lock is turned from tag mode to read/write mode. This is also possible in accordance with the invention, and in this embodiment the mobile wallet key can be read from the user's mobile station without any transmission of power.

Any features of embodiment 60 may be readily combined or permuted with any of the other embodiments 10, 20, 30, 40, 50, 70, 80, 90 and/or 91 in accordance with the invention.

Figure 7:
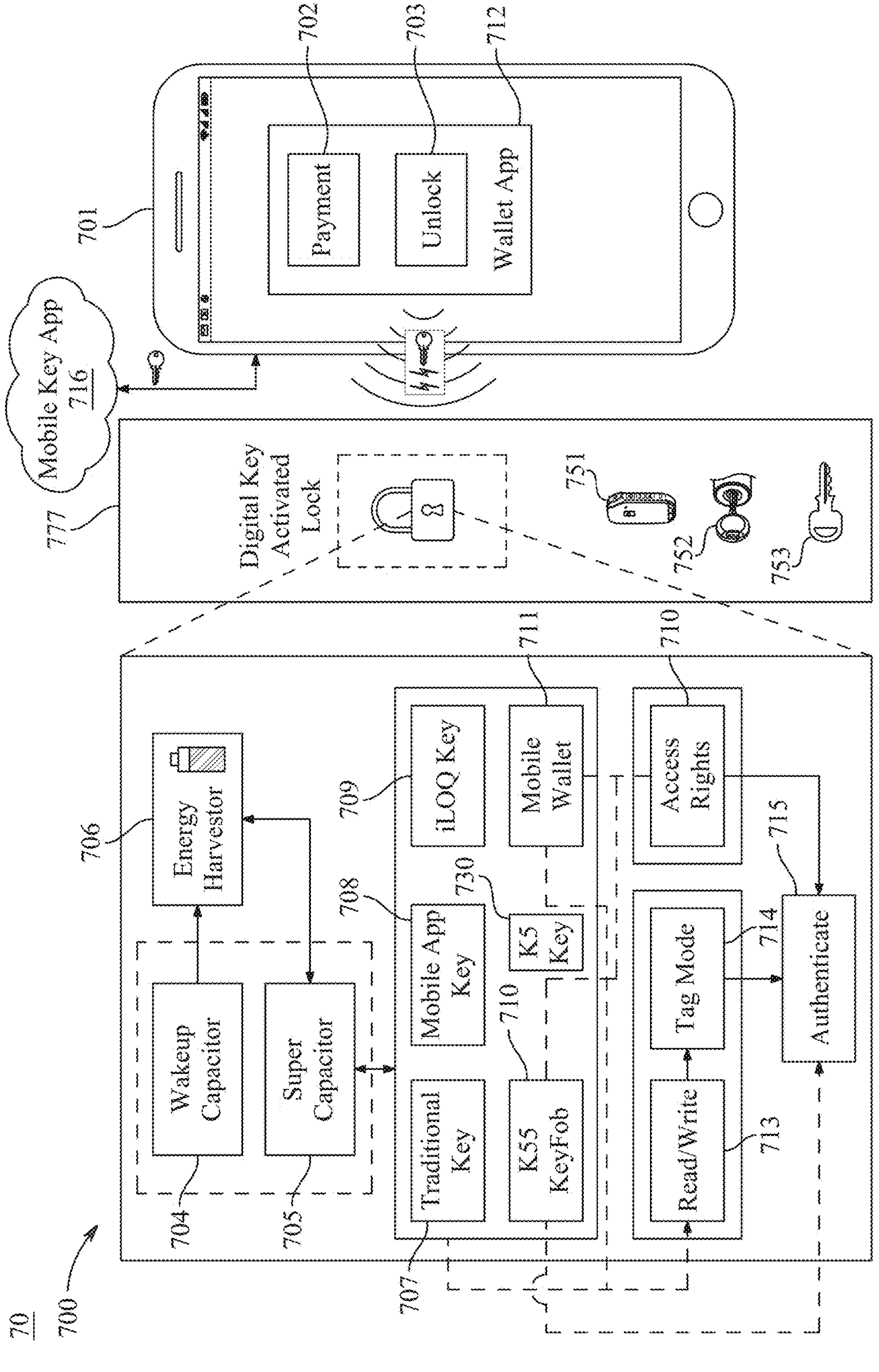
FIG. 7 demonstrates an embodiment 70 of a mobile station with a mobile keys cloud application in accordance with the invention as a block diagram.

FIG. 7 discloses a mobile station 701 with a mobile wallet cloud application 712, and the mobile wallet application comprises payments 702, member cards and other non-powered NFC interactions. A mobile keys application 716 that is integrated with the operating system of the mobile station 701 sends a virtual key to a self-powered digital lock 700. This could be for example a new Keys application 716 in iOS or Google Android or the like, which would specialise in the digitisation and/or cloudification of legacy physical keys.

It is useful to separate financial authentication and physical entry authentication in the Wallet app. This is done by separating financial NFC authentication to the payment side 702 of the Wallet App and the authentication related to unlocking of physical spaces to the unlock segment 703 of the Wallet App 712. In this embodiment 70, the separation of financial/physical access authentication is taken further. Eventually all physical space related access rights are migrated to the Mobile Key App 716. When all virtual digital keys are moved to the mobile key app 716, typically the Unlock 703 section will also be moved to the Mobile Key app 716 in accordance with the invention.

Typically, the mobile keys application 716 adds an NFC power transmission to the virtual key transmission. The added NFC power transmission is configured to power the opening of the self-powered lock 700 with the transmitted virtual key transmission. In this scenario, the self-powered digital lock 700 responds to the mobile keys virtual key in tag mode, reading the mobile wallet virtual key 711 from the Mobile Keys application 716.

This is typically done analogously to reading it from the unlock 703 section of the mobile wallet application 712 without a further power transmission from the mobile station 701, but using the earlier appended power transmission sent from the mobile keys application 716 dedicated to opening physical doors and the like.

If a mobile app 102 of the lock developer is used 708, 709, typically the digital lock 700 responds to the mobile app virtual key in tag mode, reading the app virtual key and receiving a wireless power transmission from the mobile station 701. The mobile station 701 is configured to send power wirelessly, optionally via NFC and/or Qi, to a supercapacitor 705 in the self-powered digital lock 700.

The authentication to unlock physical spaces can be realised also as a segment 703 within the Mobile Wallet app 712, or as a separate Mobile Keys App 716 typically integrated with the operating system of the mobile station 701 such as iOS or Android.

In the event of using the unlock section 703 of the Mobile Wallet App 712, typically, the mobile wallet application 712 adds an NFC power transmission to the virtual key transmission. The added NFC power transmission is configured to power the opening of the self-powered lock 700 with the transmitted virtual key transmission. In this scenario, the self-powered digital lock 700 responds to the mobile wallet virtual key in tag mode, reading the mobile wallet virtual key 711 from the mobile wallet application 712 Unlock 703 section.

Any features of embodiment 70 may be readily combined or permuted with any of the other embodiments 10, 20, 30, 40, 50, 60, 80, 90 and/or 91 in accordance with the invention.

Figure 8:
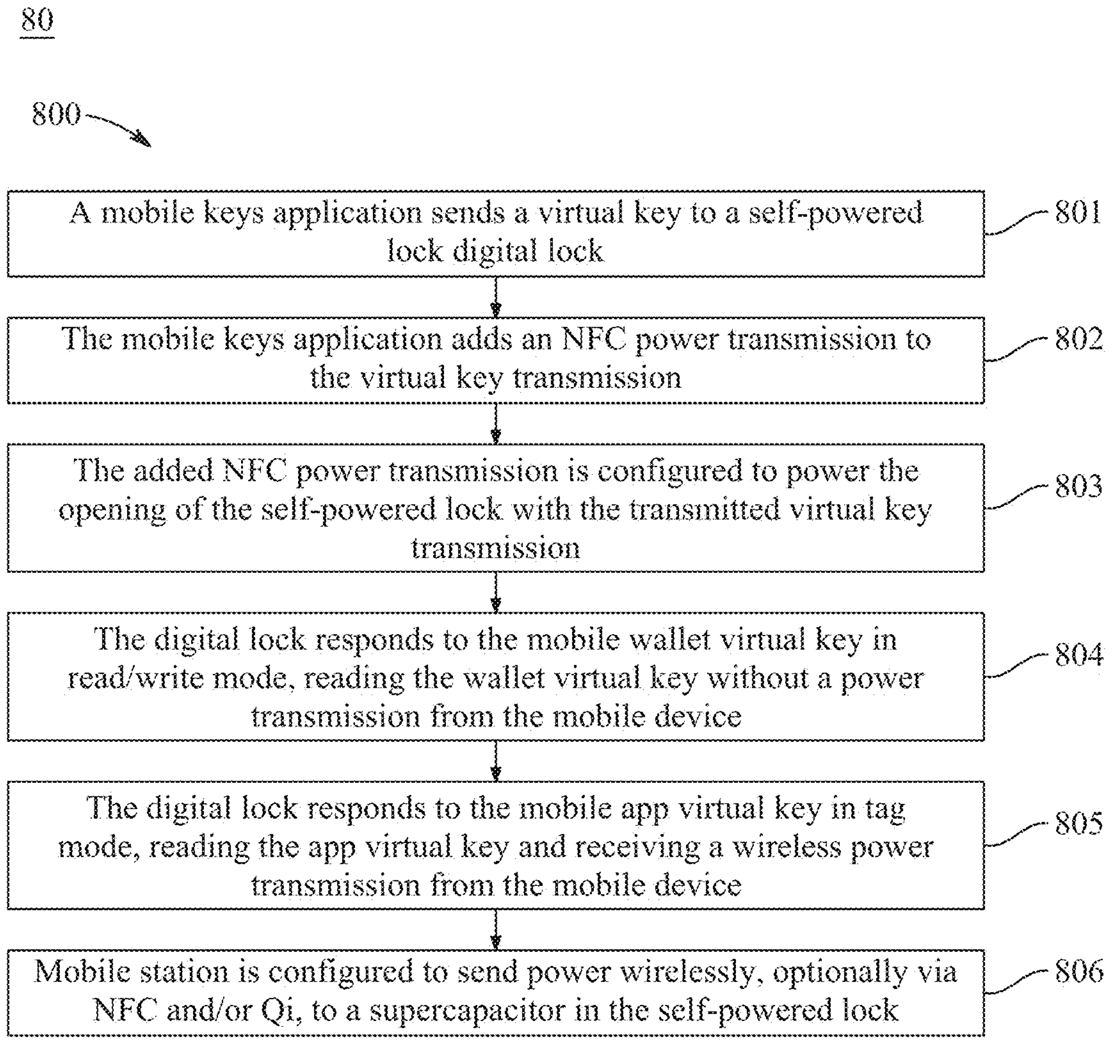
FIG. 8 demonstrates an embodiment 80 of the method of use of a mobile station with a mobile keys cloud application in accordance with the invention as a flow diagram.

FIG. 8 displays the operation of the mobile station 701 with a mobile wallet cloud application 712, and the mobile wallet application comprises payments, member cards and other non-powered NFC interactions. In phase 801 a mobile keys application 716 sends a virtual key to a self-powered digital lock 700.

In phase 802 the mobile keys application 716 adds an NFC power transmission to the virtual key transmission.

In phase 803 the added NFC power transmission is configured to power the opening of the self-powered lock 700 with the transmitted virtual key transmission.

In phase 804 the self-powered digital lock 700 responds to the mobile wallet virtual key (received from the mobile keys application 716) in read/write mode, reading the wallet virtual key without a power transmission from the mobile station 701.

In phase 805 the digital lock responds to the mobile wallet virtual key (received from the mobile keys application 716) in tag mode, reading the mobile wallet virtual key and receiving a wireless power transmission from the mobile device.

In particular embodiments this can be achieved in phase 806 where the mobile station 701 is configured to send power wirelessly, optionally via NFC and/or Qi, to a supercapacitor in the self-powered digital lock 700.

Steps 801, 802, 803, 804, 805, 806 can similarly be performed when the mobile wallet key is sent from the Unlock section 703 of the Wallet Application 712. If the access rights of the digital virtual key and the power budget of the lock allow, the lock is opened.

Any features of embodiment 80 may be readily combined or permuted with any of the other embodiments 10, 20, 30, 40, 50, 60, 70, 90 and/or 91 in accordance with the invention.

Figure 9:
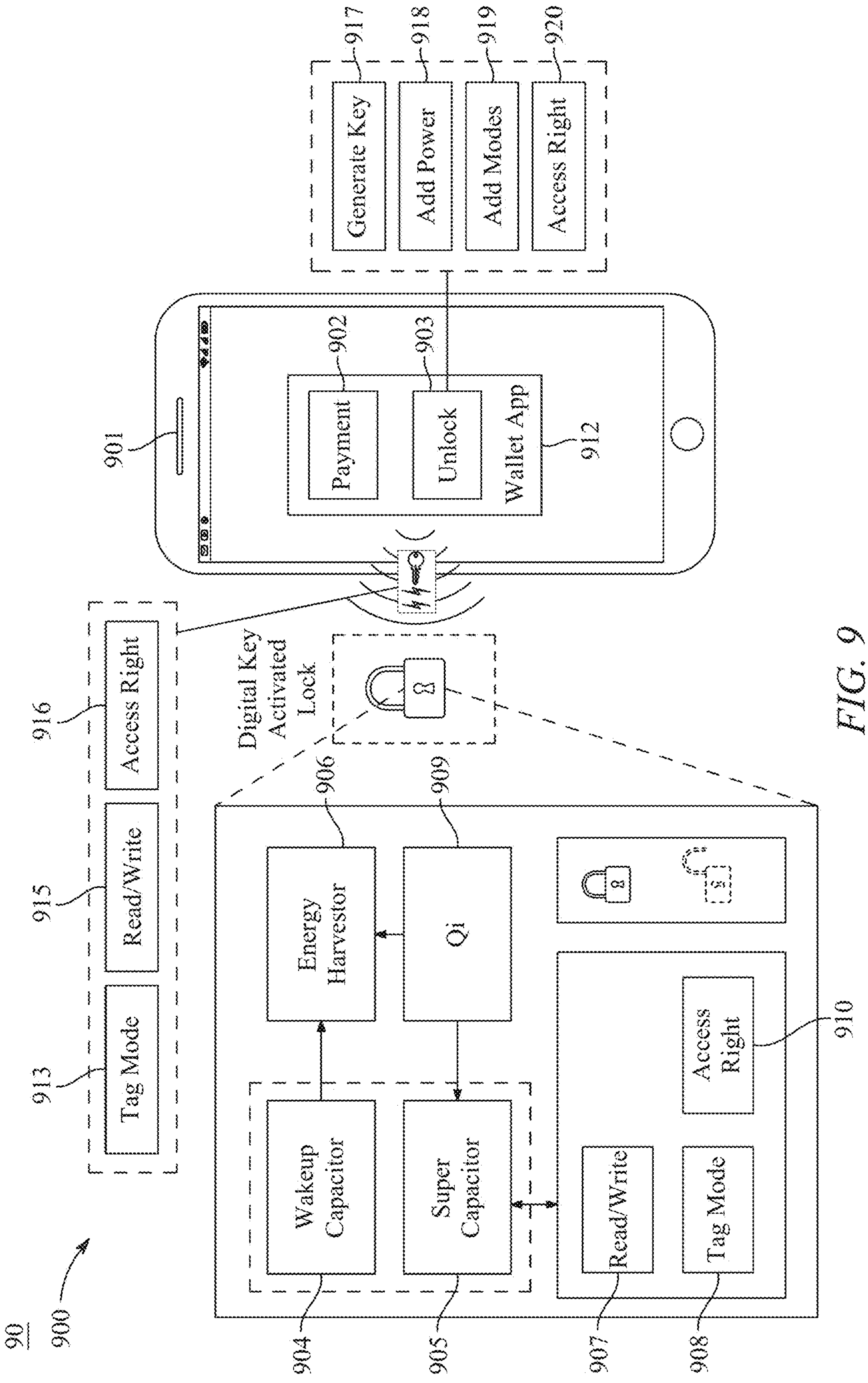
FIG. 9 demonstrates an embodiment 90 of the software program product with the inventive wallet application as a user interface diagram.

FIG. 9 displays an embodiment 90 of the mobile station 901 with a mobile wallet cloud application 912. The mobile wallet application 912 is configured to send a virtual key to a self-powered digital lock 900. The mobile wallet application 912 identifies a non-payment virtual key transmission configured to open a digital lock.

The mobile wallet application 912 then adds an NFC power transmission to the non-payment virtual key transmission. The added NFC power transmission is configured to power the opening of the self-powered lock 900 with the transmitted non-payment virtual key transmission.

Then subsequently, the digital self-powered lock 900 is configured to respond to the mobile wallet virtual key in read/write mode, reading the wallet virtual key without a further power transmission from the mobile station 901. Or alternatively, the digital self-powered lock 900 responds to the mobile wallet virtual key in tag mode, reading the wallet virtual key and receiving a wireless power transmission from the mobile station 901. Typically, power is transmitted from the mobile station 901 to the digital lock wirelessly via NFC, NFC WLC, or Qi 909.

The digital virtual key contains access rights 910 related to the opening of the self-powered digital lock 900, and if the access rights provide the access to open the self-powered digital lock 900, the digital self-powered lock is opened, otherwise the self-powered digital lock 900 is kept closed.

The mobile station 901 is configured to send power wirelessly, optionally via NFC, NFC WLC and/or Qi, to a supercapacitor 905 in the digital self-powered lock 900. Additionally, the more developed mobile station 901 and its mobile wallet application 912 may have other functionalities besides adding power 918 to self-powered locks. These include any of the following: generating virtual keys 917, adding different modes of access 919, e.g. access by car, with a group, with an accompanying person and the like, and adding access rights 910.

Any features of embodiment 90 may be readily combined or permuted with any of the other embodiments 10, 20, 30, 40, 50, 60, 70, 80 and/or 91 in accordance with the invention.

Figure 10:
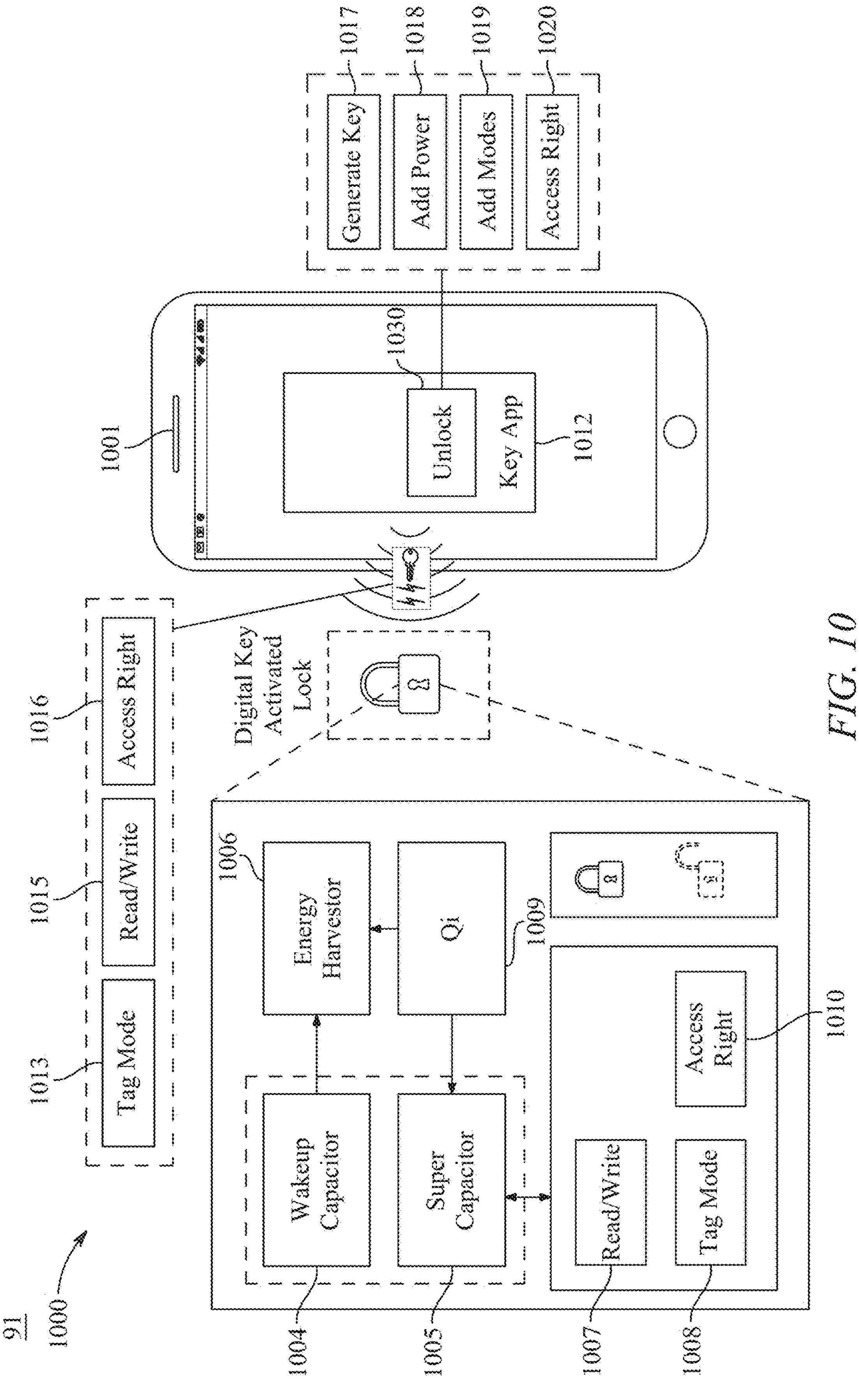
FIG. 10 demonstrates an embodiment 91 of the software program product with the inventive Keys application as a user interface diagram.

FIG. 10 discloses a mobile station 1001 with a mobile wallet cloud application in the usual way. Here a Key APP 1012 deals with all sorts of physical space related authentication, for door entry, lock opening and the like. The Key APP 1012 sends a virtual key to a self-powered lock digital lock 1000. The Key App adds an NFC power transmission to the digital virtual key transmission, which is typically received by the energy harvestor 1006. The added NFC power transmission is configured to power the opening of the self-powered lock 1000 with the transmitted virtual key transmission.

The digital self-powered lock 1000 may respond to the Key App 1012 virtual key in read/write mode, reading the Key App virtual key without a power transmission from the mobile station 1001.

However, typically the digital self-powered lock 1000 responds to the Key App 1001 virtual key in tag mode, reading the Key App virtual key and receiving a wireless power transmission from the mobile station 1001.

The mobile station 1001 is configured to send power wirelessly, which is usually received by an energy harvestor 1006, optionally via NFC, NFC WLC and/or Qi. This transmitted power is stored to a supercapacitor 1005 in the self-powered digital lock 1000.

In some embodiments both a power transmission and a financial payment could be added to a virtual Key App or mobile wallet digital virtual key. This could be useful in short duration accommodation, such as Airbnb and Booking. In this embodiment it would be possible for the digital self-powered lock 1000 to receive the payment 902, and the NFC, NFC WLC and/or Qi 1009 to transmit power. Then the digital self-powered lock 1000 is opened when the payment is sufficient, power is sufficient, and the digital virtual key access right is checked as valid for entry.

Any features of embodiment 91 may be readily combined or permuted with any of the other embodiments 10, 20, 30, 40, 50, 60, 70, 80 and/or 90 in accordance with the invention.

In all the embodiments the self-powered digital lock 100, 300, 500, 700, 900, 1000 may have a so-called Matter chip, which enables the opening of the self-powered digital lock 100, 300, 500, 700, 900, 1000 by remote via an on-line connection in accordance with the invention.

At least one special NFC WLC embodiment is also in accordance with the invention, one of which was already explained with FIG. 2.

In this embodiment: Passive detection (as of now) operates as follows: The lock has an NFC chip that works in a power-free state like a passive NFC tag. This allows a mobile device to detect the lock without the lock having active power. WLC Capability notification (new WLC) operates as follows:

The NFC chip/tag contains the WLC Capability parameter according to the NFC Forum Wireless Charging Specification. When the phone reads this information, it recognizes that the lock supports WLC charging.

Energy transfer phase (WLC handshake) operates as follows:

The phone initiates a handshake with the lock according to the WLC protocol.

The lock then wirelessly receives energy from the mobile device and charges its internal energy capacity more than without a WLC.

Operating mode change happens as follows:

When the lock's energy capacity reaches a predefined charge level, it switches the device's operating mode to NFC Reader/Writer mode.

Data reading/lock unlocking operates as follows:

In Reader/Writer mode, the lock can read the key from the mobile device's Wallet app and, if it is valid, unlock the lock.

There is also a special embodiment where the excess energy from NFC is not collected, and this excess energy is instead collected by photovoltaics or kinetic energy from the user's muscles. In this embodiment the lock supports both Wallet BLE and Wallet NFC keys without requiring a mobile application from the lock manufacturer and remains fully battery less, powered only by harvested energy. In this embodiment operation takes place as follows:

1. Key or Phone Approaches Lock

The lock is normally unpowered and waits passively.

Any NFC field near the lock will energize its harvesting frontend.

2. Lock checks if the Key or the Phone Has the Specific Application

If the specific app is found:

→ The lock behaves in Tag Mode, as usual (lock=passive NFC tag, phone or key=reader). If no app is installed:→ The lock enters Energy Harvesting Mode automatically.

3. Energy Harvesting Mode Begins

The lock uses the external NFC field or Qi (from the phone) to harvest energy.

The system stores energy into a small storage element (e.g. LIC, supercapacitor).

4. Lock Wakes and Enables BLE Advertising

Once the energy buffer reaches the BLE wake threshold, the MCU boots.

Lock immediately starts:

BLE advertising

Attempting to identify which credential type is present

Energy harvesting continues continuously in the background.

5. Credential Detection

The lock evaluates which authentication path is possible:

Possible Credential Types

Wallet NFC key (phone's secure element→OV5/OV20 tag emulation)

Wallet BLE key (Aliro BLE credential)

Detection happens in parallel with BLE advertising.

6A.-BLE Key Recognized

Lock detects a phone that can speak BLE Wallet protocol.

Lock initiates BLE authentication.

While authenticating:

It continues harvesting NFC energy.

It waits until there is sufficient stored energy for the mechanical unlock/lock cycle.

Once authenticated→performs unlock→performs lock→goes back to powerless.

6B.-BLE Key NOT Recognized

If no BLE credential is found:

Lock keeps harvesting energy longer.

It waits until energy is high enough to:

Power its Reader Mode (active NFC mode)

Perform Wallet NFC key authentication

Perform unlock & lock cycle

Once energy threshold is reached→activates Reader Mode and authenticates using Wallet NFC.

After unlock+lock→returns to powerless state.

7. After Any Credential Completes

Regardless of the path:

Unlock is performed (actuator release)

Lock can be operated

After defined time, Lock returns to locked state:

Zero-power dormant state, and is waiting for the next NFC field to wake it.

Additionally, the invention comprises one embodiment with an elaborate way of extracting said excess energy from NFC. This embodiment operates as follows:

1. Key or Phone Approaches the Lock

The lock is normally unpowered.

Any NFC field (phone/card/key) activates the harvesting frontend.

2. Lock checks if the Key or the Phone Has the Specific Application

If the specific app is found:

→The lock behaves in Tag Mode, as usual (lock=passive NFC tag, phone or key=reader). If no app is installed:→ The lock enters Energy Harvesting Mode automatically.

3. Energy Harvesting Phase Begins

The lock harvests energy from the NFC field.

Energy fills an internal storage element, e.g. LIC (Lithium Ion Capacitor), and/or supercapacitor.

If there is already stored energy from a previous opening cycle, the lock starts from a higher baseline, reducing required harvesting time.

4. Lock Wakes and Enables BLE Advertising

When minimum energy threshold is reached:

MCU boots and BLE advertising starts

Lock also begins credential-type detection.

NFC harvesting continues simultaneously.

5. Credential Detection

Lock identifies which credential path is available:

Possible credential types:

Wallet BLE key

Wallet NFC key

Detection is performed while the lock keeps harvesting energy.

6A.-BLE Wallet Key Detected (Fast Path)

Lock starts BLE authentication immediately.

During BLE authentication, the lock continues harvesting NFC energy, increasing the stored energy buffer.

When the buffer reaches the level required for actuation:

Unlock→Lock cycle executes.

Any additional energy beyond actuation requirements is kept stored for future openings, reducing energy-harvesting time the next time the lock is used.

6B.-BLE Key Not Detected→NFC Wallet Key Path

Lock continues harvesting until enough energy exists to: Power Reader Mode

Perform Wallet NFC authentication

Perform the unlock+lock cycle

After successful authentication, the lock performs unlocking and relocking.

Any remaining excess energy is retained, shortening future wake-up and authentication phases.

7. Return to Idle (Powerless) State—But With Stored Energy

After the mechanical cycle, the system drops to zero-power MCU (microcontroller unit) state.

The energy-storage element retains remaining charge, providing a "head start" for future activations.

Future opening events may:

Require less harvesting time

Boot MCU faster

Potentially skip the early harvesting phase entirely if enough charge remains.

The invention has been explained above with reference to the aforementioned embodiments, and several commercial and industrial advantages have been demonstrated. The aforementioned technologies allow the use of self-powered locks by all or some consumers, without a dedicated application from the lock manufacturer. The invention is simpler, as the consumer can open the lock from his mobile wallet application, or with a separate "Keys"-application. The invention also reduces the end cost to the consumer, because self-powered locks typically present life-time financial savings to consumers.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. A hybrid energy harvesting digital lock openable with a mobile device, wherein:

the digital lock is a self-powered lock without a battery, the digital lock is opened using a mobile app which sends an NFC signal with a virtual digital key to open the digital lock, the mobile app originated NFC signal powers the digital lock opening, wherein power is transmitted from the mobile device to the digital lock wirelessly via at least one of near-field communication (NFC) wireless charging (WLC) or Qi, the mobile app originated NFC signal contains an excess residual energy which is stored in the digital lock, and the excess residual energy is used in powering the opening of the digital lock when the digital virtual key is sent from a mobile wallet with NFC, wherein power transmission from the mobile wallet is zero or is below a defined threshold of energy sufficient to power the digital lock opening, and energy transmitted from the mobile device to the digital lock is stored in the digital lock with a supercapacitor, and the digital lock comprises an Ultra Low Power IC, with wake-up power capacitor, optionally made of Tantalum, and a supercapacitor for processing power and/or a Hybrid Layer Capacitor (HLC) and/or Lithium-ion capacitor (LIC).

2. A digital lock as claimed in claim 1, wherein the excess residual energy is derived from a photovoltaic cell or kinetic energy of the user instead of NFC.

3. A digital lock as claimed in claim 1, wherein the digital lock responds to the mobile wallet virtual key in read/write mode, reading the wallet virtual key without a power transmission from the mobile device.

4. A digital lock as claimed in claim 1, wherein the digital lock responds to the mobile app virtual key in tag mode, reading the app virtual key and receiving a wireless power transmission from the mobile device.

5. A digital lock as claimed in claim 1, wherein the digital virtual key, or parts of it, is communicated via any of the following: NFC, Bluetooth Low Energy (BLE), UWB or any combination of the aforementioned.

6. A digital lock as claimed in claim 1, wherein the virtual key contains access rights related to the opening of the digital lock, and if the access rights provide the access to open the digital lock, the digital lock is opened, otherwise the digital lock is kept closed.

7. A digital lock as claimed in claim 1, wherein the digital lock is also configured to receive the virtual digital key via Bluetooth Low Energy BLE, and determine the location of the user using UWB and/or Bluetooth Channel Sounding, and if the determined location of the user is within 1-4 meters of the lock, and the access right permits the opening of the lock, the self-powered digital lock is configured to open without any NFC transmission, and only based upon the digital virtual key received via BLE.

8. A digital lock as claimed in claim 1, wherein the digital lock comprises a capacitive sensor configured to detect the proximity of a user without physical contact, and if a user is not in proximity, the electronics of the self-powered digital lock is kept in sleep state, and if a user is detected in proximity, the electronics of the digital lock is powered and set on standby state.

9. A digital lock as claimed in claim 8 wherein the digital lock is configured to use a wake-up capacitor to power the electronics to the standby state.

10. A mobile station with a mobile wallet cloud application, wherein:

the mobile wallet application sends a digital virtual key to a self-powered digital lock, the mobile wallet application identifies a non-payment digital virtual key transmission configured to open the self-powered digital lock, the mobile wallet adds an NFC power transmission to the non-payment digital virtual key transmission, wherein power is transmitted from a mobile device to the self-powered digital lock wirelessly via at least one of near-field communications (NFC) wireless charging (WLC) or Qi, the added NFC power transmission being configured to power the opening of the self-powered digital lock with the transmitted non-payment digital virtual key transmission, energy transmitted from the mobile device to the self-powered digital lock is stored in the digital lock with a supercapacitor, and the self-powered digital lock comprises an Ultra Low Power IC, with wake-up power capacitor, optionally made of Tantalum, and a supercapacitor for processing power and/or a Hybrid Layer Capacitor (HLC) and/or Lithium-ion capacitor (LIC).

11. A mobile station as claimed in claim 10, wherein the digital lock responds to the mobile wallet virtual key in read/write mode, reading the wallet virtual key without a power transmission from the mobile device.

12. A mobile station as claimed in claim 10, wherein the digital lock responds to the mobile wallet virtual key in tag mode, reading the wallet virtual key and receiving a wireless power transmission from the mobile device.

13. A mobile station as claimed in claim 10, wherein the virtual key contains access rights related to the opening of the digital lock, and if the access rights provide the access to open the digital lock, the digital lock is opened, otherwise the digital lock is kept closed.

14. A mobile station as claimed in claim 10, wherein mobile station is configured to send power wirelessly, optionally via NFC and/or Qi, to a supercapacitor in the digital lock.

15. A mobile station as claimed in claim 10, wherein the digital virtual key, or parts of it, is communicated via any of the following: NFC, Bluetooth Low Energy (BLE), UWB or any combination of the aforementioned.

16. A mobile station as claimed in claim 10, wherein the mobile station is also configured to transmit and the lock receive the virtual digital key via Bluetooth Low Energy BLE, and determine the location of the user using UWB and/or Bluetooth Channel Sounding, and if the determined location of the user is within 1-4 meters of the lock, and the access right permits the opening of the lock, the self-powered digital lock is configured to open without any NFC transmission, and only based upon the digital virtual key received via BLE.

17. A self-powered digital lock, wherein:

the self-powered digital lock is without a battery, energy harvesting is done as a first operation before any kind of communication takes place, after the lock has harvested enough energy, the lock starts Bluetooth low energy (BLE) and recognizes the key type and then, if the type is mobile wallet digital virtual key the lock maintains its near-field communication (NFC) mode as tag mode, power transmission from the mobile wallet NFC signal is zero or below a defined threshold of energy sufficient to power the lock opening, power is transmitted from a mobile device to the self-powered digital lock wirelessly via at least one of NFC wireless charging (WLC) or Qi, the mobile wallet digital virtual key is read via BLE, if the mobile wallet digital virtual key access rights allow the opening of the lock, the lock is opened, energy transmitted from the mobile device to the self-powered digital lock is stored in the self-powered digital lock with a supercapacitor, and the self-powered digital lock comprises an Ultra Low Power IC, with wake-up power capacitor, optionally made of Tantalum, and a supercapacitor for processing power and/or a Hybrid Layer Capacitor (HLC) and/or Lithium-ion capacitor (LIC).

18. A digital lock as claimed in claim 17, wherein the excess residual energy is derived from a photovoltaic cell or kinetic energy of the user instead of NFC.

19. A digital lock as claimed in claim 17, wherein the digital lock responds to the mobile wallet virtual key in read/write mode, reading the wallet virtual key without a power transmission from the mobile device.

20. A digital lock as claimed in claim 17, wherein the digital lock responds to the mobile app virtual key in tag mode, reading the app virtual key and receiving a wireless power transmission from the mobile device.

21. A digital lock as claimed in claim 17, wherein the digital virtual key, or parts of it, is communicated via any of the following: NFC, Bluetooth Low Energy (BLE), UWB or any combination of the aforementioned.

22. A digital lock as claimed in claim 17, wherein the virtual key contains access rights related to the opening of the digital lock, and if the access rights provide the access to open the digital lock, the digital lock is opened, otherwise the digital lock is kept closed.

23. A digital lock as claimed in claim 17, wherein the digital lock is also configured to receive the virtual digital key via Bluetooth Low Energy BLE, and determine the location of the user using UWB and/or Bluetooth Channel Sounding, and if the determined location of the user is within 1-4 meters of the lock, and the access right permits the opening of the lock, the self-powered digital lock is configured to open without any NFC transmission, and only based upon the digital virtual key received via BLE.

24. A digital lock as claimed in claim 17, wherein the digital lock comprises a capacitive sensor configured to detect the proximity of a user without physical contact, and if a user is not in proximity, the electronics of the self-powered digital lock is kept in sleep state, and if a user is detected in proximity, the electronics of the digital lock is powered and set on standby state.

25. A digital lock as claimed in claim 17 wherein the digital lock is configured to use a wake-up capacitor to power the electronics to the standby state.

* * * * *